United States Patent [19]

Schimmel et al.

[11] 4,020,050
[45] Apr. 26, 1977

[54] METHOD OF PREPARING POLYMER FROM DIANHYDRIDE AND HYDRAZINE OR DIHYDRAZIDE

[75] Inventors: Karl F. Schimmel, Verona; Marco Wismer, Gibsonia, both of Pa.

[73] Assignee: PPG Industries, Inc., Pittsburgh, Pa.

[22] Filed: Oct. 2, 1974

[21] Appl. No.: 511,322

Related U.S. Application Data

[62] Division of Ser. No. 369,628, June 13, 1973, abandoned.

[52] U.S. Cl. .................... 260/78 TF; 260/47 CP; 260/65
[51] Int. Cl.$^2$ ............... C08G 73/08; C08G 73/10
[58] Field of Search ............ 260/47 CP, 78 TF, 65, 260/326 N

[56] References Cited

UNITED STATES PATENTS 3,360,502  12/1967  Loncrini .............................. 260/78

FOREIGN PATENTS OR APPLICATIONS 37,688  7/1967  Japan ............................ 260/78 TF

OTHER PUBLICATIONS

Chem. Abstracts, Korshak et al., Preparation of Polymers from Pyromellitic Diahydride and Hydrazine 6881w, vol. 70, 1969.

*Primary Examiner*—Lester L. Lee
*Attorney, Agent, or Firm*—Alan T. McDonald; John E. Curley; Robert DeMajistre

[57] ABSTRACT

Novel polymers formed from the reaction of tetracarboxylic dianhydrides and hydrazines or hydrazides which may be cross-linkable by further reaction with a hydrazine or a hydrazide are disclosed.

1 Claim, No Drawings

METHOD OF PREPARING POLYMER FROM DIANHYDRIDE AND HYDRAZINE OR DIHYDRAZIDE

This is a division of application Ser. No. 369,628, filed June 13, 1973, and now abandoned.

DESCRIPTION OF INVENTION

Briefly this invention comprises novel polymers preferably formed from the reaction of a tetracarboxylic dianhydride and a mono-functional alcohol to form an ester-acid of the formula:

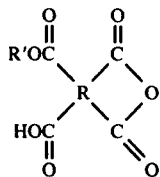

(I)

which is subsequently reacted with a hydrazine or hydrazide to form a polysalt having the structural formula:

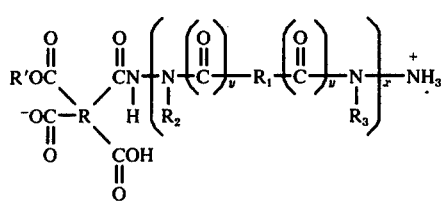

(II)

the above polysalt is then heated to form a compound of the structural formula:

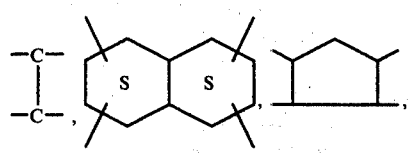

(III)

the above (III), when R is aldehyde ketone, aliphatic chlorine, bromine or iodine functional, can be further reacted with a hydrazine or hydrazide to form a cross-linked network. By aliphatic chlorine, bromine or iodine functional is meant any aliphatic radical having a chlorine, bromine or iodine atom or atoms and includes aromatics having aliphatic groups containing chlorine, bromine, or iodine atoms thereon connected to the aromatic ring.

In the above formulae R is a tetravalent organic radical having at least 2 carbon atoms. Examples of tetravalent organic radicals are, but not limited to the aromatic tetravalent radicals of the structure:

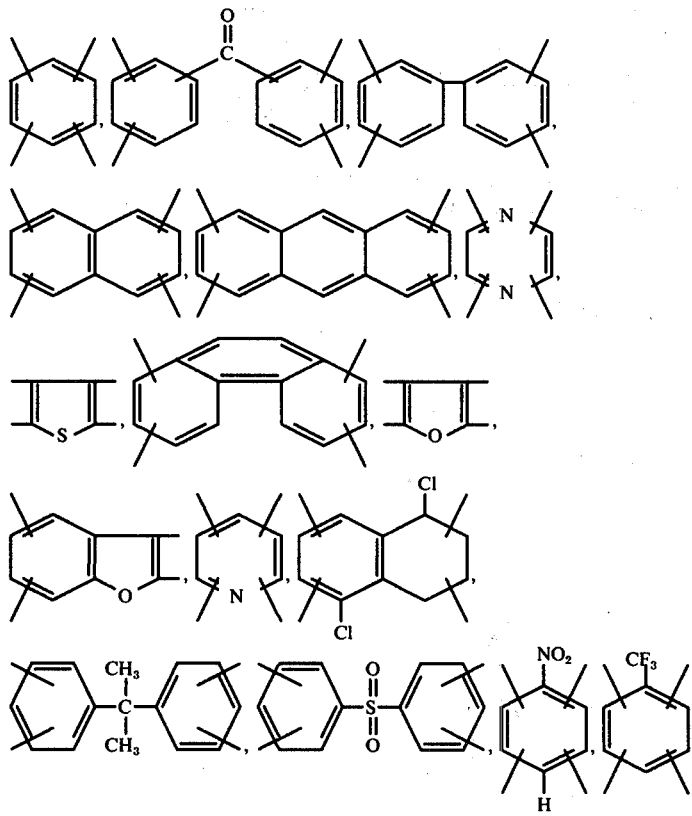

and the like, and the aliphatic and cycloaliphatic tetravalent organic radicals, such as -continued

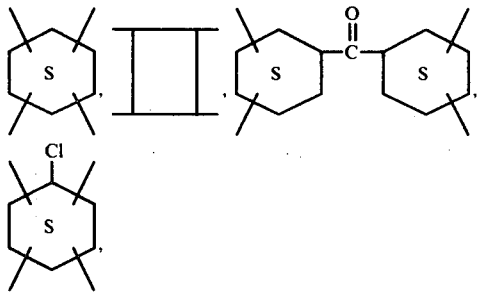

and the like.

R₁ is a divalent organic radical having at least 2 carbon atoms; examples of said divalent organic radicals are, but not limited to, the aromatic divalent organic radicals, such as:

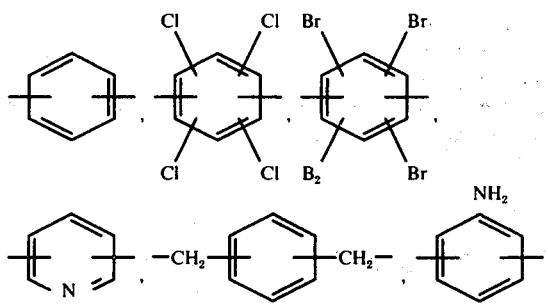

and the like, and the divalent organic aliphatic radicals and cycloaliphatic radicals such as

wherein $n$ is 2 to 34,

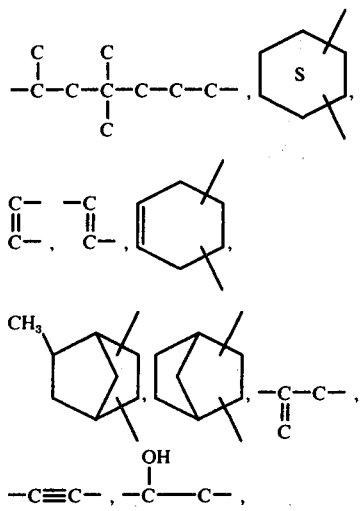

and the like.

R' is a monovalent alkyl, cycloalkyl or alkenyl radical having 1 to 20 carbon atoms.

R₂ and R₃ are selected from the group consisting of monovalent alkyl, aryl, aralkyl, cycloalkyl, heterocycloalkyl and hydrogeno radicals and isomers thereof, and $x$ and $y$ are either 0 or 1.

Any hydrazine or hydrazide is suitable for cross-linking the compounds of formula III (when R is ketone, aldehyde, aliphatic chlorine, bromine or iodine containing), provided the hydrazine or dihydrazide has two terminal — NH₂ groups, examples of hydrazines useful for cross-linking are, but not limited to; hydrazine, 1,2-ethylene dihydrazine, p-phenylene dihydrazine, alpha, alpha'-diethyl-m-phenylene dihydrazine, and the like; examples of hydrazides are, but not limited to, succinoyl dihydrazide, adipoyl dihydrazide, isophthaloyl dihydrazide, terephthaloyl dihydrazide, pyridine-2,4-dicarbonyl dihydrazide and the like.

The cross-linking reaction is accomplished, when R is aldehyde or ketone functional, by reacting the carbonyl containing polymer with the hydrazine or hydrazide to form a cross-linking bridge of the structure

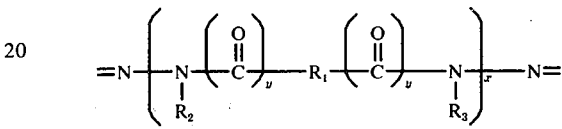

wherein R₁, R₂, R₃, $x$ and $y$ are of the structures and values as previously described.

The cross-linking reaction is effected by the ketone or aldehyde carbonyl reacting, i.e., condensing, with the terminal — NH₂ group of the hydrazine or hydrazide employed to produce the cross-linked polymer and the water of condensation as a by-product. When the functionality of R is aliphatic chlorine, bromine or iodine, the terminal — NH₂ groups of the hydrazine or hydrazide react with the halogen bearing carbon atom to produce a cross-linking bridge of the structural formula

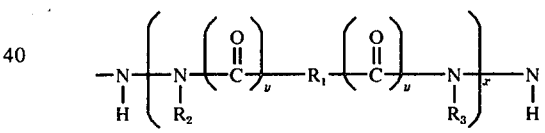

wherein R₁, R₂, R₃, $x$ and $y$ are of the structures and values as previously described.

Hence, the physical properties of the final polymeric material can be adjusted by the degree of cross-linking of the polymer. Futher, the degree of cross-linking can be varied by the amount of ketone, aldehyde, aliphatic chlorine, bromine or iodine functional tetracarboxylic dianhydride used in the synthesis of the polymer. The degree of cross-linking can also be varied by the stoichiometric amount of the hydrazine or the hydrazide used in the synthesis of the polymer. Therefore, a wide range of chemical and physical properties of the cross-linked polymer can be achieved, making the cross-linked polymers of the instant invention adaptable for a plurality of uses.

The polymers of the instant invention can be further modified by substituting a portion of the hydrazine or dihydrazide in formula II with a diamine, thereby introducing polyimide groups into the polymer chain. Suitable diamines for the aforementioned purpose are, but not limited to, ethylene diamine, 4,4'diaminodiphenyl propane, 4,4'diaminodiphenyl methane, benzidine, 3,3'-dichloro-benzidine; 4,4'diaminodiphenyl sulfide; 3,3'diaminodiphenyl sulfone; 1,5-diaminonapthalene, meta-phenylene-diamine, para-phenylene-diamine; 3,3'dimethoxy benzidine and the like.

In addition to the modification of the polymers of the instant invention by means of substitution of a diamine for the hydrazine or dihydrazide, the polymers can be modified by substituting a portion of the tetracarboxylic dianhydride with a tricarboxylic monoanhydride for the purpose of providing

groups along the polymer chain. These tricarboxylic - hydrazine or hydrazide reaction products being more fully described in copending application Ser. No. 369,629, filed concurrently herewith.

The preferred method of forming the polymers of the instant invention comprises: admixing 1 mole of tetracarboxylic dianhydride with a suitable solvent, adding 1 mole of monofunctional alcohol to form the acid - ester of formula I, subsequently adding the hydrazine or dihydrazide (in a sufficient amount to form either the cross-linked or noncross-linked polymer on heating) to produce the polysalt of formula II. At this stage the solution can be further reduced in polysalt concentration by the addition of an aqueous nitrogenous base solution such as an aqueous ammonia or amine solution, or additional organic solvent. The polysalt, either aqueous or non-aqueous, can be coated on a substrate such as glass, glass fibers, metal, wood, or the like and heated to a temperature of about 200° C. to form either the compound of formula III or a cross-linked version thereof.

Another method of forming the polymers of the instant invention comprises admixing 1 mole of the tetracarboxylic dianhydride with an excess of the monofunctional alcohol to form the diester - diacid of the tetracarboxylic acid, and subsequently adding the hydrazine or dihydrazide (in an amount sufficient to form either the cross-linked or noncross-linked polymer on heating) to form a polysalt having the structural formula:

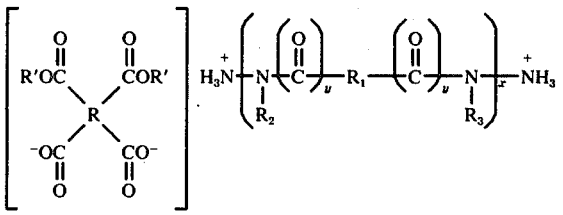

If the above polysalt is to be formed, the temperature of the mixture is typically kept below 100° F., otherwise an OR' group of the diester-diacid will be displaced by an —NH₂ group and the salt of formula II will be formed.

The above method has been characterized by specific molar amounts of reactants, however different molar amounts may be used providing the molar ratios of the reactants remain the same.

The preferred method of forming the polymers of the instant invention is desired in order that the hydrazine or hydrazide is chemically bonded to the tetrafunctional R group, hence, eliminating the possibility of vaporization of the hydrazine or hydrazide on subsequent heating causing a disproportionation of the stoichiometry of the reactants.

Suitable solvents for admixing with the tetracarboxylic dianhydride are those having a high degree of polarity. Examples of such solvents are N-N-dimethyl acetamide; N,N-dimethyl formamide; dimethyl sulfoxide; N-methyl pyrrole and the like.

Transesterification catalysts can be used to aid in the conversion of the polysalt to the polymer of formula III. Examples of such transesterification catalysts are, but not limited to, oxalic acid, dimethyl terephthalate, dibutyl sebacate, butyl stannoic acid and the like.

Coating techniques known to those skilled in the art can be used for depositing the polysalts of formula II on the desired substrate. For example, when the compound of formula III is to be used as a binder for glass fibers, application can be achieved by dipping a mat of glass fibers, or glass fiber paper into an aqueous ammonia polysalt (formula II) solution and allowing the solution to soak into said glass fibers (approximately 1 to 30 seconds). After soaking, the glass fiber material is permitted to drip dry and then is subsequently baked at approximately 250° F. to 300° F. for about 30 to 60 minutes. Thus, fiber glass paper or fiber glass mat is produced which may tolerate temperatures of up to and greater than 600° F. without substantial loss of strength or integrity. Further, the polysalt of formula II can be applied to glass fibers during their formation by drawing the fibers from the bushing and across the surface of a roller or pad applicator containing the polysalt solution and spaced proximately from the bushing through which the glass fibers are formed. Additionally the polysalt can be applied to textile glass fibers before or after a weaving operation has been completed to impart properties compatible to the final use of the textile material itself. Further, the polysalt can be applied to a mat of glass fibers by spraying or other like techniques to impart strength and other advantageous properties to the mat. In this instance the polysalt can be applied to staple fibers as they are being formed into mat or to the finished mat.

The polymers of the instant invention can be used as binders for fibers such as cotton, hemp, wool, hair, silk, rayon, nylon, Orlon, saran, Ardil, and the like, in addition to glass fibers, to impart temperature resistance and strength to the aforementioned fibers.

Fiber reinforced laminates and castings and nonreinforced castings can be produced by the polymers of the instant invention where certain chemical and physical properties are desired.

Further, coated metallic conductive wire such as copper or zinc, can be produced by dipping the selected wire into the polysalt (formula II) solution, the solution being aqueous or nonaqueous and subsequently heating the polysalt coated wire to a temperature adequate to convert the polysalt to the polymer of formula III or a cross-linked version thereof. Wire coated by polymers having the repeating structural unit of formula III or the cross-linked version thereof can withstand service temperatures of 600° F. without any observable degeneration of the polymer coating; thus, an insulated wire is produced capable of withstanding elevated service temperatures. The coating thickness on the surface of the wire can be adjusted by the viscosity of the polysalt solution. A low (25 centipoises at 20° C.) viscosity polysalt solution would produce a think coating ($\approx$ 10 microns) and a high viscosity ($\approx$ 1000 centipoises at 20° C.) polysalt solution would produce a thick coating (about 30 microns).

Also, flat or contoured substrates such as the cellulosics including wood, paper and the like; glass, metal and the like can be coated with the polysalt of formula II by spraying the low viscosity polysalt solution by conventional spraying techniques; by applying the polysalt solution with a standard paint brush, by depositing the polysalt solution by any other conventional coating technique; the technique selected being contingent on the substrate and film thickness desired.

The polysalt can be pigmented wth pigments such as titaniun dioxide, zinc oxide, calcium carbonate, lithopone, phthalocynine blue, carbon black, iron oxide or the like to impart color to the coating; or with silica, clay, talc and the like to impart the desired film and solution properties to the polysalt and subsequently formed polymer. The polysalt which is deposited on a substrate may be used as a coating in itself, due to the hard, cohesive properties of the polysalt after the solvent and/or water and ammonia evaporate, or the polysalt can be heated to form the polymer of formula III or the cross-linked version thereof. If fire retardant coating properties are desired, the polysalt film itself is the desired coating, however, the polymer of formula III or the cross-linked version thereof also imparts fire retardant characteristics.

In addition, adhesive compositions can be formed by the polymers of the instant invention in that the polymer structure can be adapted to have bonding characteristics to metal, glass, mica, asbestos, wood, paper and like substrates.

The invention will be more clearly illustrated by the examples below; however, these examples which described specific embodiments should not be construed to limit the invention in any way.

EXAMPLE I

GLASS FIBER BINDER

Solution A: 484 grams of a solution composed of 46 grams of ethyl alcohol and 438 grams of N-methyl pyrrole was added to 322 grams of benzophenone tetracarboxylic dianhydride in a 1.5 liter beaker. The above mixture was heated on a steam bath until by visual obseration the mixture appeared homogeneous. The mixture was heated for an additional ½ hour after this observation.

Solution B: 69 grams of 85% hydrazine hydrate was added to 300 grams of N-methyl pyrrole in a beaker and agitated manually at ambient temperature (25° C.).

Polysalt formation: Solution A was added to Solution B while both were at room temperature. A 40° C. increase in temperature of the mixed solution was observed.

Binder Solution: 14 grams of the above polysalt solution was added to a solution consisting of 86 grams of water in a beaker and manually agitated with 4 grams of 28% aqueous ammonium hydroxide until the mixture appeared homogeneous.

Application to glass fiber paper: Glass fiber paper composed of 100% glass fibers was dipped in the binder solution for about 3 seconds and then the glass fiber paper with the binder solution thereon was heated to 300° F. for 1 hour. Microscopic examination of the coated glass fiber paper showed a uniform coating of binder on the glass fibers. Two samples of glass fiber paper coated as above described exhibited good strength and after 4 hours of subjecting the above coated glass fiber paper samples to 600° F. in a hot air oven, the polymer weight loss of each sample was 4.88% + 0.01%.

EXAMPLE II

The binder solution of Example I was applied to glass fiber paper (100% glass fiber fibers) by supporting the paper on a Buchner funnel having the same interior dimensions and configuration as the glass fiber paper, and pouring 104 grams of the binder solution of Example I onto the glass fiber paper while applying a vacuum to the surface of the glass fiber paper opposite the surface of initial contact with the binder solution. Two samples of the glass fiber paper coated as above described exhibited good strength and after subjecting the above coated glass fiber paper samples to 600° F. for 4 hours, the polymer weight loss of each sample was 4.50% ± 0.16%.

EXAMPLE III

Preparation of adipoyl dihydrazide: To a 2 liter round bottom single-neck flask equipped with a heating mantle and condenser was charged 343 grams of dimethyl adipate, 473 milliliters of 85% hydrazine hydrate and 1 liter of denatured ethanol; the above mixture was held at reflux for 12 hours and allowed to cool. After cooling to room temperature, the crystalline adipoyl dihydrazide was filtered and washed with denatured alcohol and subsequently vacuum dried. 313 grams of adipoyl dihydrazide was recovered representing 91.5% yield. The polysalt and binder solution was perpared from adipoyl dihydrazide and benzophenone tetracarboxylic dianhydride and coated on glass fiber paper using the procedure as described in Example I, and after heating samples of the coated glass fibers at 600° F. for 4 hours, a polymer weight loss of 50% was observed.

EXAMPLE IV

Terephthaloyl dihydrazide was prepared according to the procedure of Example III. The polysalt and binder solution, prepared from terephthaloyl dihydrazide and benzophenone tetracarboxylic dianhydride, was conated on glass fiber paper using the procedure as described in Example I and after heating the samples of the coated glass fibers at 600° F. for 4 hours, a polymer weight loss of 27% was observed.

EXAMPLE V

Example I was repeated substituting 228 grams of pyromellitic tetracarboxylic dianhydride for the benzophenone tetracarboxylic dianhydride. The resulting polymer solution was applied to a glass fiber paper using the procedure of Example I and the heated paper after heating at 600° F. for 4 hours showed a polymer loss of 6.7% ± 0.1%.

EXAMPLE VI

To a 2 liter single-neck round bottom flask is charged 322 grams of benzophenone tetracarboxylic dianhydride and 1.5 liters of isopropyl alcohol and the mixture was subsequently refluxed for 1 hour. To the resultant homogeneous solution is added 69 grams of 85% hydrazine hydrate, forming the polysalt solution. A film of the polysalt solution is then cast on a mild steel panel by means of a 3 mil draw bar, and said film is allowed to air dry for 24 hours. The film which is produced in this manner was continuous, hard and demonstrated fire retardancy when exposed to open flame.

EXAMPLE VII

Example VI is repeated substituting tridecyl alcohol in place of isopropyl alcohol. The polymer was coated on a mild steel panel using the procedure of Example VI. The properties of films produced on metal in this manner exhibit good hardness, flexibility and fire retardancy.

Although the present invention has been described with respect to specific details of certain embodiments thereof, it is not intended that such details act as limitations upon the scope of the invention except insofar as is set forth in the accompanying claims.

We claim:

1. A method of producing a high temperature polymer comprising:
    reacting a tetracarboxylic dianhydride with a monofunctional alcohol to form an ester-acid having the structural formula:

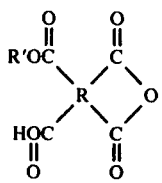

reacting said ester-acid with a member selected from the group consisting of a hydrazine and a hydrazide, thereby forming a polysalt having the structural formula:

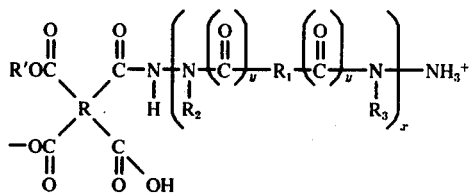

heating said polysalt to form a high temperature resistant polymer having the structural formula:

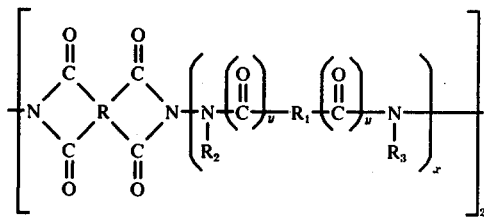

wherein R is a tetravalent organic radical having at least 2 carbon atoms, $R_1$ is a divalent organic radical having at least two carbon atoms, R' is a monovalent organic radical having 1 to 20 carbon atoms, $R_2$ and $R_3$ are selected from the group consisting of alkyl, aryl, aralkyl, cycloalkyl, and hydrogen radicals and $x$ and $y$ are either 1 or 0.

* * * * *